UNITED STATES PATENT OFFICE.

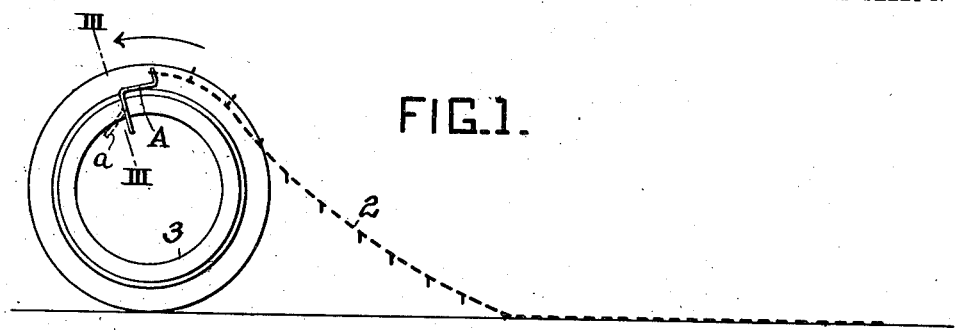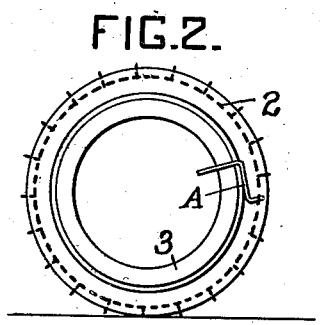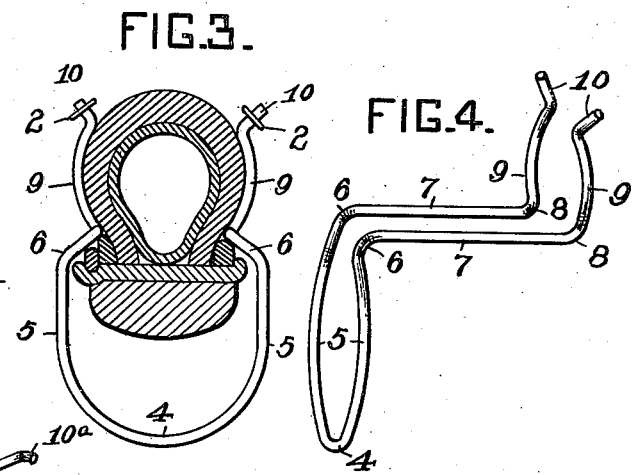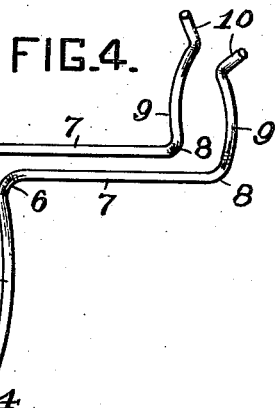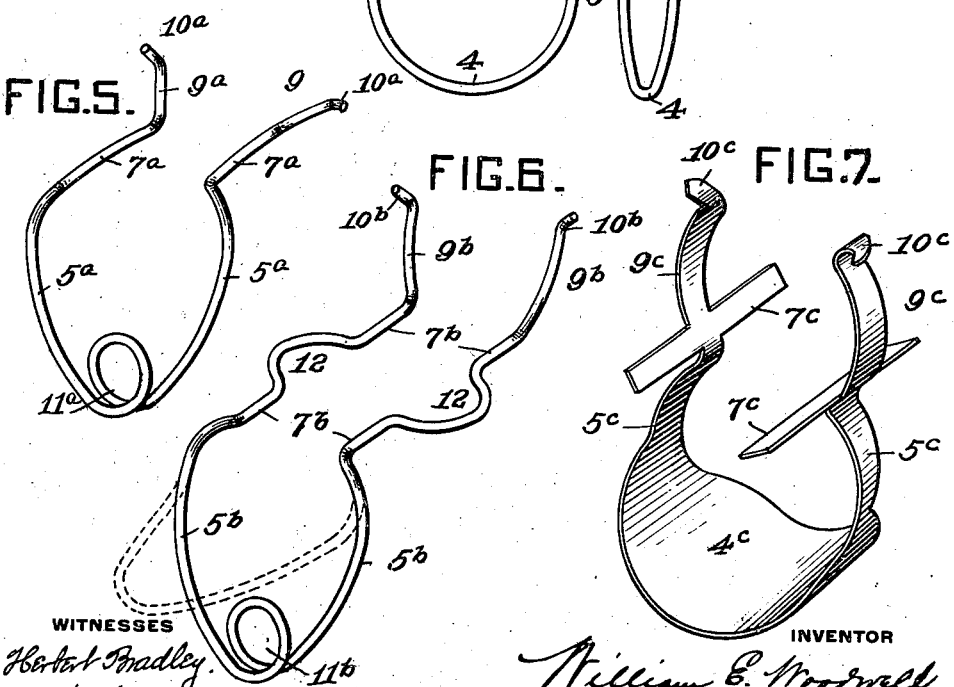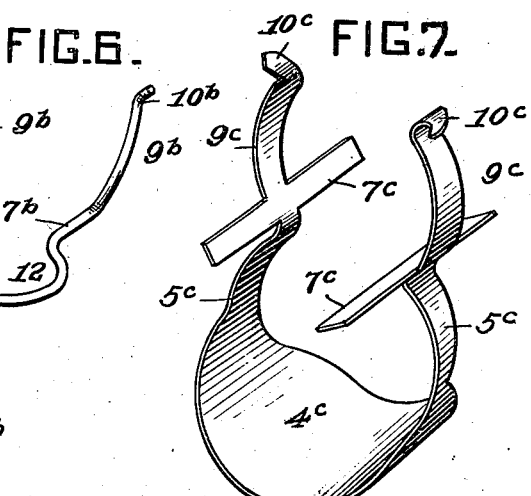

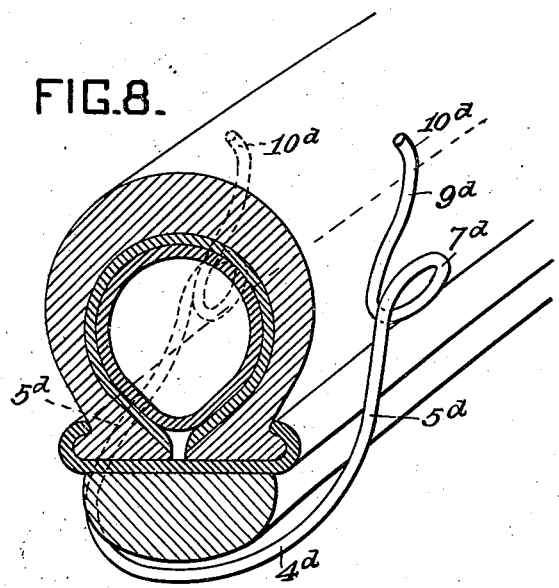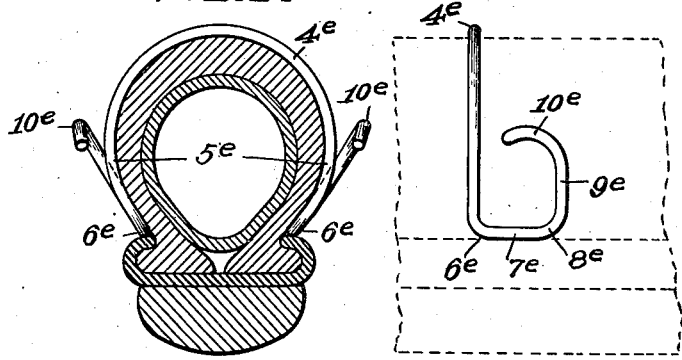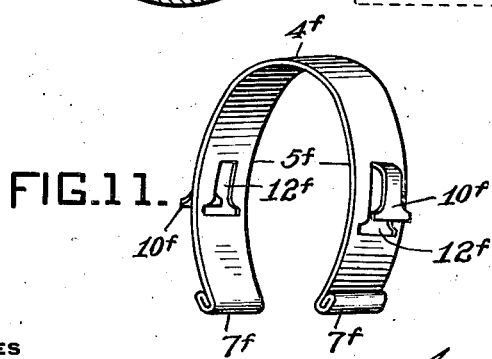

WILLIAM E. WOODWELL, OF PITTSBURGH, PENNSYLVANIA, ASSIGNOR OF ONE-FOURTH TO JOHN K. WOODWELL, OF PITTSBURGH, PENNSYLVANIA.

DEVICE FOR ADJUSTING TIRE-CHAINS.

1,065,758. Specification of Letters Patent. Patented June 24, 1913.

Application filed December 9, 1912. Serial No. 735,627.

*To all whom it may concern:*

Be it known that I, WILLIAM E. WOOD-WELL, a citizen of the United States, residing at Pittsburgh, in the county of Allegheny and State of Pennsylvania, have invented certain new and useful Improvements in a Device for Adjusting Tire-Chains, of which the following is a specification.

My invention has for its object to provide a device for facilitating the application of non-skid chains to the tires of automobiles, and consists of a metallic clamping device having a resilient loop portion for engagement around the wheel, provided with gripping portions adapted to seat in the annular recesses at the side of the tire in holding engagement therewith, and provided with projecting terminals having hooks for attachment of the ends of the chain.

The device is adapted for easy application and removal to and from the wheel, whereby the ends of the chain may be temporarily attached to the terminal hooks, the chain following the wheel, as it revolves, around the tread of the tire until it is completely encircled, whereupon the ends of the chain are connected, and the adjusting device removed.

The invention is capable of embodiment in various different forms, embodying a resilient loop, adapting it to application from either side of the wheel, *i. e.* with the loop embracing either the inner felly or the outer tire, as may be preferred.

Preferred forms of the device are illustrated in the accompanying drawings, in which—

Figure 1 is a view in side elevation showing the application of the device to a wheel, and the operation of applying the chain. Fig. 2 is a similar view showing the wheel revolved sufficiently to bring the ends of the chain together. Fig. 3 is an enlarged sectional detail view taken on the line III. III. of Fig. 1, and illustrating the device as applied. Fig. 4 is a perspective detail view of the device shown in Fig. 3. Figs. 5 to 7 inclusive are various modified forms of the device. Fig. 8 is a perspective view showing a further modified construction adapted to lie by its loop portion closely up against the felly of the wheel. Fig. 9 is a cross sectional view showing a construction adapted to embrace the tire by its resilient loop. Fig. 10 is a view of the device in side elevation. Fig. 11 is a perspective detail view showing a further modified form made of sheet metal having punched out hooks.

The device consists generally of a resilient holder for one end of the tread chain, adapted to be temporarily applied to the wheel of the vehicle to carry the chain around it, and then removed after the ends of the chain have been connected or brought together to position for being connected.

In the operation of applying the chain 2 to the wheel 3, the adjusting device A is clamped around the rim of the wheel, embracing its sides in the manner shown in Figs. 1, 2 and 3. In the form of the device illustrated in these figures, the adjuster is made of a single continuous piece of wire of the necessary size to provide ample strength and sufficient resilience, and is formed into a central loop 4 having the sides 5, 5, bent abruptly inwardly at the points 6, and then extended along to form substantially parallel side gripping members 7, 7, which snugly embrace the upper sides of the rim and tire, and fit into the annular channels at the base of the usual pneumatic tire. At their other ends, the members 7 are deflected upwardly at the points 8 and curved or bent outwardly, as indicated at 9, for making embracing contact with the sides of the tire. These upwardly projecting portions are then bent outwardly or backwardly, forming hooked terminals 10, 10, for attachment of the terminal links of the traction chain 2, as will be readily understood.

The purpose of the loop 4, which in the forms shown, is made considerably larger than the wheel rim, is to provide ample gripping by the portions 7 and 9, to insure positive holding of the adjuster in place during the operation.

The terminal links of the chain having been hooked over the terminals 10, the automobile is caused to travel slowly a distance sufficient to effect the necessary revolution of the wheel, the chain being gradually drawn around it, fitting itself to position, and bringing the terminal ends of the chain into close proximity so that they may be connected in the usual manner. The adjuster is then easily removed by disconnecting it from the links and springing it sufficiently open to release it from engagement with the wheel.

In Fig. 5, the sides 5ª are of the same general arrangement with relation to each other, but are connected at the bottom by one or more spring coils 11ª, thereby increasing the gripping resiliency of the device to any desired extent. In this form the end arm members 9ª are extended outwardly and backwardly at an angle and terminate in backwardly bent terminals 10ª for attachment of the chains in the manner described. The side gripping members 7ª are adapted to grip against the sides of the tire in the same manner as above described.

The construction shown in Fig. 6 is substantially the same as that of Fig. 5, except that the side shank members 7ᵇ are provided with outwardly projecting finger loops 12, whereby the device may be grasped and drawn apart, the other parts being similarly numbered with the exponent b. Fig. 6 also shows the resilient loop bent back in dotted lines in the same general direction as the side arm gripping members 7ᵇ, as indicated at a, Fig. 1, whereby to lie up underneath the wheel felly and provide a resisting bearing. This arrangement also results in economy of space, facilitating packing or storage of the device.

Fig. 7 shows another construction cut out of sheet metal, having the resilient loop portion 4ᶜ formed with the spring metal sides 5ᶜ, extended gripping arms having hook terminals 10ᶜ, and longitudinally disposed gripping and bracing portions 7ᶜ adapted to lie along the annular channels between the edges of the wheel rim and the tire sides.

In Fig. 8, I show a further modified construction in which the resilient looped portion 4ᵈ is adapted to embrace the wheel rim and felly, the sides 5ᵈ having coiled portions 7ᵈ arranged to aline with the channel at each side of the wheel at the base of the tire, in the same manner as do the portions 7 of the construction first described. The sides of the device are extended upwardly above the coils 7ᵈ, as indicated at 9ᵈ, terminating in backwardly bent or curved hook terminals 10ᵈ, adapted to receive the endmost links of the chain. By this construction, the device is maintained in place by the spring action of the sides 5ᵈ and the engagement of the coils 7ᵈ fitting snugly in the channels, the loop 4ᵈ being braced by its resisting engagement against the under side of the rim or felly. This construction is somewhat more compact, while having the same holding advantages.

In Figs. 9 and 10, I show a further modified construction adapted to embrace around the outer side or tread of the tire by the looped portion 4ᵉ, adapted to fit the tire snugly and to lie closely against the body portion in the manner shown. In this construction the sides 5ᵉ converge toward each other by the bent portions or shoulders 6ᵉ which are extended along for a short distance, as at 7ᵉ, and then bent upwardly as at 8ᵉ, forming arms 9ᵉ having terminal hooks 10ᵉ for attachment of the chains. It will be readily seen that the holding device as thus made may be clamped around the tire, embracing it snugly, the looped portion, by its bearing upon the tire, resisting any strain or pull of the chain, and that the side gripping portions may be shaped in any suitable manner to provide for engagement and form the terminal hooks 10ᵉ for the chain, which extend somewhat outwardly beyond the tire surface, as indicated in Fig. 9.

In Fig. 11, I show another form similar to that of Figs. 9 and 10, but made of sheet metal formed into an embracing ring having a looped portion 4ᶠ and sides 5ᶠ having terminal gripping portions 7ᶠ, preferably reinforced by doubling the metal upon itself, and adapted to fit snugly within the annular channels of the tire. The sides 5ᶠ are punched out, as indicated at 12ᶠ, providing projecting hooks 10ᶠ of any suitable form, for connection with the terminal links of the chain. As shown, these hooks are capable of being used at either side, so as to facilitate use of the device in either direction.

The advantages of the constructions illustrated in Figs. 9, 10 and 11 are that they fit snugly around the tire, may be run over in revolving the wheel without injury, are easily and quickly put on or taken off, and are small and compact in form.

It will be readily understood that the device may be changed or varied in different ways as to form or design by the skilled mechanic, but that, in order to secure efficient results, the device must be of a form having sufficient resiliency and gripping action to hold it fixedly upon the wheel and in engagement with the tire by side pressure into the annular channels at each side between the base of the tire and the rim. Also that the chain-retaining hook terminals shall be so located as to receive and hold the chain links, and to clear the surface of the ground in traveling over it.

Having described my invention, what I claim is:

1. A device for adjusting tire chains to automobile wheels consisting of an embracing resilient loop having inwardly deflected binding shoulders and projecting chain attaching hooks.

2. A chain adjuster for automobile wheels formed of a continuous metallic body portion having a middle loop formed by embracing sides provided with inwardly extending shouldered portions adapted to engage the annular channels at opposite sides of the wheel and having projecting hook portions adapted to engage the chain links.

3. A chain adjuster for automobile wheels formed of a continuous metallic body portion having a middle loop formed by embracing sides provided with inwardly extending shouldered portions adapted to engage the annular channels at opposite sides of the wheel and having terminal projecting hook portions adapted to engage the chain links.

4. A chain adjuster for automobile wheels formed of a continuous wire body portion bent to provide an embracing loop, inwardly extending oppositely located gripping shoulders, and projecting terminal hooks.

5. In a device of the class described formed of spring wire, the combination of a middle embracing loop portion, terminal hook portions, and inwardly extending gripping shouldered portions between the loop portion and the hook portions.

6. A device for attaching tire chains to an automobile wheel consisting of a wire clamp adapted to embrace the wheel and having side shouldered portions adapted to extend into the annular channels at each side of the wheel and outwardly projecting terminal hook portions.

7. A device for attaching tire chains to an automobile wheel consisting of a wire clamp adapted to embrace the wheel and having oppositely arranged elongated side-gripping portions terminating in chain attaching hooks.

In testimony whereof I hereunto affix my signature in the presence of two witnesses.

WILLIAM E. WOODWELL.

Witnesses:
C. M. CLARKE,
FREDK. STAUB.